US012321579B2

(12) United States Patent
Meirhaeghe et al.

(10) Patent No.: US 12,321,579 B2
(45) Date of Patent: Jun. 3, 2025

(54) GUIDANCE IMAGE GENERATION FOR A MOBILE DEVICE

(71) Applicant: Motorola Mobility LLC, Chicago, IL (US)

(72) Inventors: Olivier D Meirhaeghe, Lincolnshire, IL (US); Amit Kumar Agrawal, Bangalore (IN); Satyabrata Rout, Bangalore (IN); Gokula Ramanan, Tamil Nadu (IN)

(73) Assignee: Motorola Mobility LLC, Chicago, IL (US)

( * ) Notice: Subject to any disclaimer, the term of this patent is extended or adjusted under 35 U.S.C. 154(b) by 248 days.

(21) Appl. No.: 18/107,171

(22) Filed: Feb. 8, 2023

(65) Prior Publication Data

US 2024/0264729 A1 Aug. 8, 2024

(51) Int. Cl.
*G06F 3/04845* (2022.01)
*A63F 13/2145* (2014.01)
(Continued)

(52) U.S. Cl.
CPC ...... *G06F 3/04845* (2013.01); *A63F 13/2145* (2014.09); *A63F 13/52* (2014.09); *G06F 3/14* (2013.01); *G06F 9/452* (2018.02)

(58) Field of Classification Search
CPC ........ G06F 3/04845; G06F 3/14; G06F 9/452; A63F 13/2145; A63F 13/52
See application file for complete search history.

(56) References Cited

U.S. PATENT DOCUMENTS

| 5,195,179 A | 3/1993 | Tokunaga |
| 5,521,841 A | 5/1996 | Arman et al. |

(Continued)

FOREIGN PATENT DOCUMENTS

| CN | 106648025 A | * | 5/2017 | ........... G06F 1/3237 |
| CN | 113126862 A | * | 7/2021 | ......... G06F 3/04842 |

(Continued)

OTHER PUBLICATIONS

U.S. Appl. No. 18/107,092, filed Feb. 28, 2024 , "Non-Final Office Action", U.S. Appl. No. 18/107,092, filed Feb. 28, 2024, 13 pages.

(Continued)

*Primary Examiner* — King Y Poon
*Assistant Examiner* — Vincent Alexander Providence
(74) *Attorney, Agent, or Firm* — FIG. 1 Patents

(57) ABSTRACT

Techniques for guidance image generation for a mobile device are described and are implementable to generate a guidance image for display by a first device based on digital content displayed by a second device. For instance, a mobile device executes and controls a gaming application, and communicates digital content from the application to a display device. A screenshot of the digital content displayed by the remote display device is captured, and based on the screenshot the mobile device generates a guidance image. The guidance image depicts one or more touchpoints of the application, and is displayed by the mobile device. The mobile device is further operable to terminate display of the guidance image, such as based on receipt of an instance proximity-based input. The mobile device recalls the guidance image subsequent to termination of display, such as based on a user request to recall the guidance image.

20 Claims, 9 Drawing Sheets

(51) Int. Cl.
*A63F 13/52* (2014.01)
*G06F 3/14* (2006.01)
*G06F 9/451* (2018.01)

(56) References Cited

U.S. PATENT DOCUMENTS

| | | | |
|---|---|---|---|
| 5,760,767 | A | 6/1998 | Shore et al. |
| 5,852,435 | A | 12/1998 | Vigneaux et al. |
| 5,884,056 | A | 3/1999 | Steele |
| 6,069,606 | A | 5/2000 | Sciammarella et al. |
| 6,332,147 | B1 | 12/2001 | Moran et al. |
| 6,463,444 | B1 | 10/2002 | Jain et al. |
| RE38,401 | E | 1/2004 | Goldberg |
| RE38,609 | E | 10/2004 | Chen et al. |
| 6,807,361 | B1 | 10/2004 | Girgensohn et al. |
| 7,143,362 | B2 | 11/2006 | Dieberger et al. |
| 7,149,974 | B2 | 12/2006 | Girgensohn |
| 7,343,026 | B2 | 3/2008 | Niwa et al. |
| 9,491,374 | B1 | 11/2016 | Avrahami et al. |
| 10,147,141 | B1 | 12/2018 | Rixford |
| 10,387,098 | B2 | 8/2019 | Park et al. |
| 10,531,039 | B1 | 1/2020 | Bender et al. |
| 10,554,921 | B1 | 2/2020 | Lim et al. |
| 11,583,760 | B1 | 2/2023 | Agrawal et al. |
| 12,229,397 | B2 | 2/2025 | Agrawal et al. |
| 2003/0184598 | A1 | 10/2003 | Graham |
| 2003/0189588 | A1 | 10/2003 | Girgensohn et al. |
| 2005/0162384 | A1 | 7/2005 | Yokoyama |
| 2006/0090141 | A1 | 4/2006 | Loui et al. |
| 2006/0103631 | A1 | 5/2006 | Mashima et al. |
| 2006/0112349 | A1 | 5/2006 | Clow et al. |
| 2006/0120624 | A1 | 6/2006 | Jojic et al. |
| 2006/0252541 | A1 | 11/2006 | Zalewski et al. |
| 2007/0101293 | A1 | 5/2007 | Cherry et al. |
| 2007/0112926 | A1 | 5/2007 | Brett et al. |
| 2007/0124507 | A1 | 5/2007 | Gurram et al. |
| 2008/0096654 | A1 | 4/2008 | Mondesir et al. |
| 2008/0250408 | A1 | 10/2008 | Tsui et al. |
| 2009/0204881 | A1 | 8/2009 | Murthy et al. |
| 2010/0082585 | A1 | 4/2010 | Barsook et al. |
| 2012/0050183 | A1 | 3/2012 | Lee |
| 2012/0226742 | A1 | 9/2012 | Momchilov et al. |
| 2013/0067422 | A1 | 3/2013 | Hong |
| 2013/0217498 | A1 | 8/2013 | Wang |
| 2013/0249819 | A1 | 9/2013 | Akifusa et al. |
| 2014/0006634 | A1 | 1/2014 | Eacott et al. |
| 2014/0098038 | A1 | 4/2014 | Paek et al. |
| 2014/0179423 | A1* | 6/2014 | Deng ............... A63F 13/235 463/31 |
| 2014/0192137 | A1 | 7/2014 | Kim et al. |
| 2014/0277843 | A1 | 9/2014 | Langlois et al. |
| 2014/0320398 | A1 | 10/2014 | Papstein |
| 2014/0349757 | A1 | 11/2014 | Nogami et al. |
| 2016/0210011 | A1 | 7/2016 | Ho |
| 2016/0283063 | A1 | 9/2016 | Missig et al. |
| 2017/0078428 | A1 | 3/2017 | Unter Ecker |
| 2017/0258449 | A1* | 9/2017 | Nielsen ............... A61B 8/467 |
| 2017/0277498 | A1 | 9/2017 | Wood, Jr. et al. |
| 2017/0371844 | A1* | 12/2017 | Yao ............... G06F 3/04883 |
| 2019/0056962 | A1* | 2/2019 | Ng ............... G06F 9/452 |
| 2019/0147721 | A1* | 5/2019 | Avitan ............... G06F 1/3209 340/573.1 |
| 2019/0156788 | A1 | 5/2019 | Lee et al. |
| 2019/0182113 | A1 | 6/2019 | Alam et al. |
| 2019/0294268 | A1 | 9/2019 | Koyama et al. |
| 2019/0378519 | A1 | 12/2019 | Dunjic et al. |
| 2020/0285438 | A1 | 9/2020 | Lagnado et al. |
| 2020/0356243 | A1 | 11/2020 | Meyer et al. |
| 2021/0097208 | A1 | 4/2021 | Donahue et al. |
| 2021/0181922 | A1 | 6/2021 | Chang et al. |
| 2021/0248483 | A1 | 8/2021 | Tomasik et al. |
| 2021/0349627 | A1 | 11/2021 | Chang et al. |
| 2022/0070371 | A1 | 3/2022 | Bushman et al. |
| 2022/0070389 | A1 | 3/2022 | Tangeland et al. |
| 2023/0041046 | A1 | 2/2023 | Agrawal et al. |
| 2023/0045005 | A1 | 2/2023 | Meirhaeghe et al. |
| 2024/0264734 | A1 | 8/2024 | Agrawal et al. |

FOREIGN PATENT DOCUMENTS

| | | | | |
|---|---|---|---|---|
| CN | 113868269 | A | * | 12/2021 |
| CN | 114489398 | A | * | 5/2022 |
| JP | 2013148990 | A | * | 8/2013 |
| JP | 2014021857 | A | * | 2/2014 |
| KR | 20160006337 | A | * | 1/2016 |
| NO | 20181316 | A1 | * | 10/2018 |
| WO | WO-2017033569 | A1 | * | 3/2017 ............. B60K 11/04 |

OTHER PUBLICATIONS

"Auto Hotspot, How to | Samsung Galaxy S10 Plus", YouTube Video uploaded by Omarr Ghafoor [online][retrieved Jun. 23, 2021]. Retrieved from the Internet <https://www.youtube.com/watch?v=2V6s31zA7p4>., Oct. 30, 2019, 4 Pages.

"Check your phone's notifications in Samsung DeX", Samsung Electronics America, Inc. [retrieved Jul. 16, 2021]. Retrieved from the Internet <https://www.samsung.com/us/support/answer/ANS00062702/>., 2019, 3 Pages.

"Do you know about Auto Hotspot?", Samsung [retrieved Jun. 23, 2021]. Retrieved from the Internet <https://r2.community.samsung.com/t5/Tech-Talk/Do-you-know-about-Auto-Hotspot/td-p/2967111>., Dec. 4, 2019, 5 Pages.

"How do you automatically activate Mobile hotspot via Bluetooth connection on Windows 10 Mobile?", in: Windows Central Forums [online][retrieved Jul. 12, 2021]. Retrieved from the Internet <https://forums.windowscentral.com/ask-question/452584-how-do-you-automatically-activate-mobile-hotspot-via-bluetooth-connection-windows-10-mobile.html>., Feb. 19, 2017, 11 Pages.

"Instant Hotspot on your Mac", Apple Inc. [retrieved Jun. 23, 2021]. Retrieved from the Internet <https://support.apple.com/guide/macbook-air/instant-hotspot-apdae69c81f1/mac>., Feb. 2019, 2 Pages.

"Non-Final Office Action", U.S. Appl. No. 17/395,405, filed Dec. 27, 2021, 21 pages.

"Setting up Auto Hotspot on my Samsung phone", Samsung [retrieved Jun. 23, 2021]. Retrieved from the Internet <https://www.samsung.com/au/support/mobile-devices/setup-auto-hotspot/>., Oct. 20, 2020, 8 Pages.

Pratik , "How to Use Your Phone as a Drawing Pad for PC", TechWiser Blog [online][retrieved Jun. 8, 2021]. Retrieved from the Internet <https://techwiser.com/use-phone-as-drawing-pad-for-pc/>., Jul. 15, 2020, 12 pages.

U.S. Appl. No. 17/395,405, filed Jun. 22, 2022, , "Final Office Action", U.S. Appl. No. 17/395,405, filed Jun. 22, 2022, 38 pages.

U.S. Appl. No. 17/395,405, filed Oct. 28, 2022, , "Non-Final Office Action", U.S. Appl. No. 17/395,405, filed Oct. 28, 2022, 39 pages.

U.S. Appl. No. 17/397,002, filed Aug. 3, 2022, , "Non-Final Office Action", U.S. Appl. No. 17/397,002, filed Aug. 3, 2022, 25 pages.

U.S. Appl. No. 17/397,002, filed Nov. 16, 2022, , "Notice of Allowance", U.S. Appl. No. 17/397,002, filed Nov. 16, 2022, 9 pages.

U.S. Appl. No. 17/397,002, filed Jan. 19, 2023, , "Supplemental Notice of Allowability", U.S. Appl. No. 17/397,002, filed Jan. 19, 2023, 3 pages.

U.S. Appl. No. 17/473,384, filed Oct. 6, 2022, , "Non-Final Office Action", U.S. Appl. No. 17/473,384, filed Oct. 6, 2022, 14 pages.

Agrawal, Amit Kumar et al., "U.S. Application as Filed", U.S. Appl. No. 17/473,384, filed Sep. 13, 2021, 68 pages.

Agrawal, Amit Kumar et al., "U.S. Application as Filed", U.S. Appl. No. 17/397,002, filed Aug. 9, 2021, 82 pages.

Agrawal, Amit Kumar et al., "US Application as Filed", U.S. Appl. No. 18/107,092, filed Feb. 8, 2023, 52 pages.

Agrawal, Amit Kumar et al., "US Application as Filed", U.S. Appl. No. 18/107,134, filed Feb. 8, 2023, 57 pages.

Bohn, Dieter , "Chromebook Instant Tethering expands beyond Google devices and phones", The Verge Blog, Vox Media, LLC. [online][retrieved Jun. 23, 2021]. Retrieved from the Internet <https://www.theverge.com/2019/2/4/18210378/chromebook-instant-tethering-

(56) References Cited

OTHER PUBLICATIONS android-mobile-hotspot-chrome-os-expansion>., Feb. 4, 2019, 6 Pages.
Cipriani, Jason, "How to use Apple's Instant Hotspot feature", CNET [online][retrieved Jun. 23, 2021]. Retrieved from the Internet <https://www.cnet.com/how-to/how-to-use-apples-instant-hotspot-feature/>., Feb. 7, 2019, 4 Pages.
Desai, Rahul B. et al., "U.S. Application as Filed", U.S. Appl. No. 17/462,281, filed Aug. 31, 2021, 57 pages.
Heinisch, Christian, "HotSpot Automatic (free)", Google Play [retrieved Jul. 12, 2021]. Retrieved from the Internet <https://play.google.com/store/apps/details ?id=de.christian_heinisch.hotspot.enablehotspot&hl=en_US&gl=US>., Jun. 7, 2018, 3 Pages.
Meirhaeghe, Olivier D. et al., "U.S. Application as Filed", U.S. Appl. No. 17/395,405, filed Aug. 5, 2021, 80 pages.
Russell, Brandon, "Galaxy S21 features wireless support for Samsung DeX on PC", XDA Developers Blog [online][retrieved Mar. 30, 2021]. Retrieved from the Internet <https://www.xda-developers.com/galaxy-s21-wireless-support-samsung-dex-on-pc/>., Feb. 5, 2021, 7 pages.
Snow, Jeffrey T. et al., "U.S. Application as Filed", U.S. Appl. No. 17/473,312, filed Sep. 13, 2021, 48 pages.
Tappert, Charles C. et al., "Chapter 6—English Language Handwriting Recognition Interfaces", In: Text Entry Systems: Mobility, Accessibility, Universality, Morgan Kaugmann [retrieved Jun. 27, 2022]. Retrieved from the Internet <https://doi.org/10.1016/B978-012373591-1/50006-1>, 2007, pp. 123-137.
U.S. Appl. No. 18/107,092, filed Aug. 23, 2024, "Final Office Action", U.S. Appl. No. 18/107,092, filed Aug. 23, 2024, 18 pages.
"Corrected Notice of Allowability", U.S. Appl. No. 18/107,092, Jan. 22, 2025, 2 pages.
"Notice of Allowance", U.S. Appl. No. 18/107,092, Dec. 9, 2024, 9 pages.
"Non-Final Office Action", U.S. Appl. No. 18/107,134, Jan. 13, 2025, 12 pages.

* cited by examiner

GUIDANCE IMAGE GENERATION FOR A MOBILE DEVICE

BACKGROUND

Today's person is afforded a tremendous selection of devices that are capable of performing a multitude of tasks. For instance, desktop and laptop computers provide computing power and screen space for productivity and entertainment tasks. Further, smartphones and tablets provide computing power and communication capabilities in highly portable form factors. Many people have access to multiple different devices and use of a particular device depends on the person's current status, such as on the go, in the office, at home, and so forth. While individual instances of devices provide functionality for discrete sets of tasks, the ability for devices to intercommunicate with one another greatly expands available task options and operating environments. For instance, a typical smartphone is able to wirelessly cast visual content to a larger screen device to enable enhanced enjoyment of the content.

In the context of mobile gaming, however, current techniques for device intercommunication are limited. Some smartphones are able to perform "screen mirroring" to replicate content displayed on the smartphone on an external device. However, screen mirroring is computationally expensive, which introduces "lag" to gameplay as well as rapidly depletes battery resources. Further, conventional screen-mirroring wastes computational resources by displaying redundant digital content on the smartphone in a gaming scenario where a user's gaze is directed to the external device. Thus, conventional techniques for device intercommunication in a gaming context are computationally expensive and lead to a diminished user experience.

BRIEF DESCRIPTION OF THE DRAWINGS

Aspects of guidance image generation for a mobile device are described with reference to the following Figures. The same numbers may be used throughout to reference similar features and components that are shown in the Figures.

DETAILED DESCRIPTION

Figure 1:
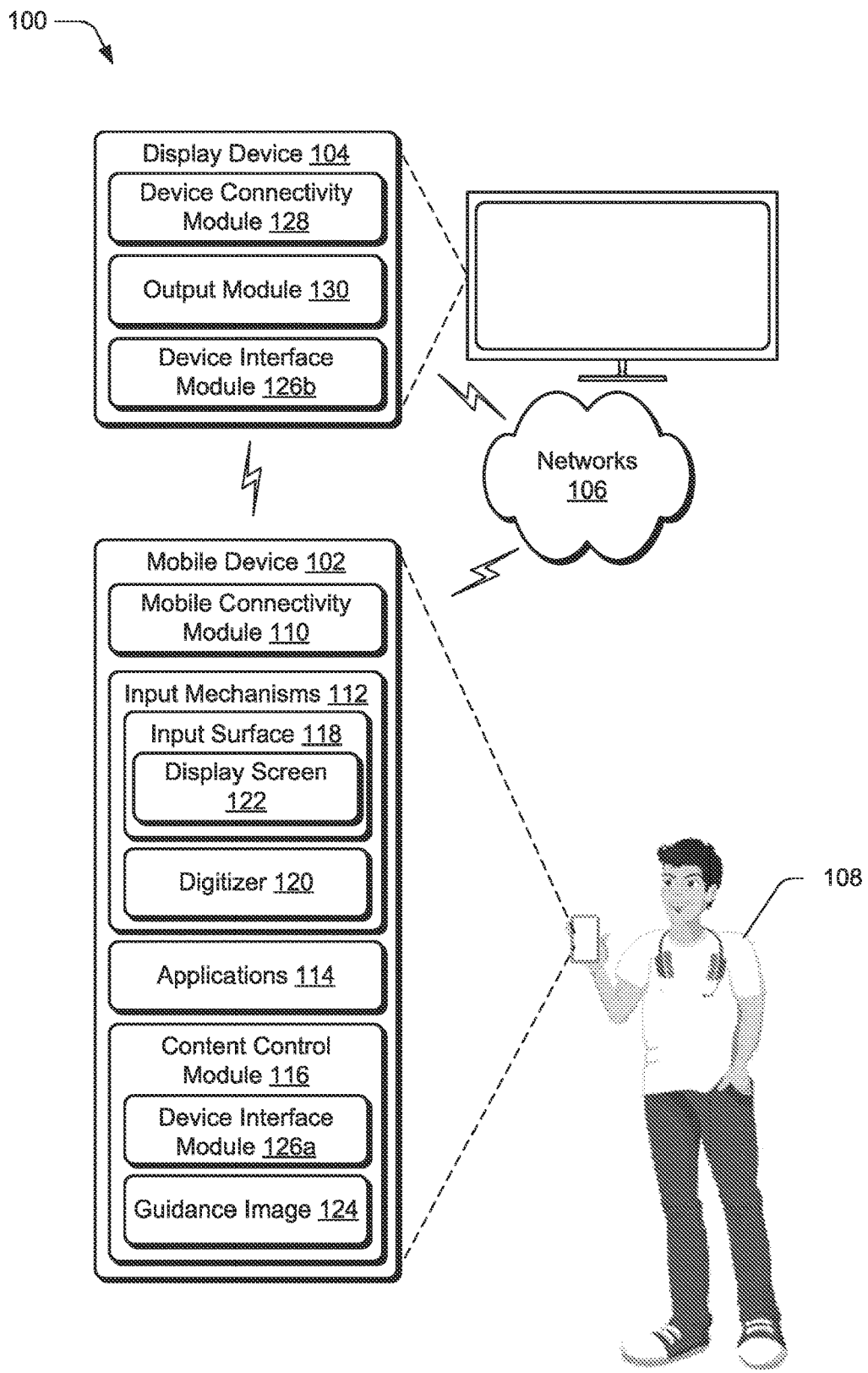
FIG. 1 illustrates an example environment in which aspects of guidance image generation for a mobile device can be implemented.

Techniques for guidance image generation for a mobile device are described and are implementable to generate a guidance image for display by a first device, e.g., a mobile device, that depicts digital content from an application displayed by a second device, e.g., a remote display device. The described implementations, for instance, enable generation of the guidance image to inform a user of one or more touchpoints of the application, e.g., one or more controls of a gaming application. The described implementations further enable the mobile device to terminate display of the guidance image, e.g., once gameplay beings. In this way, the guidance image provides an initial reference image to "teach" a user of the mobile device where the touchpoints are, while conserving computational resources during execution of the application as part of the gameplay session, which increases device battery life, and results in an enhanced user experience.

According to various implementations, a first computing device, e.g., a mobile device, is operable to establish a content connectivity session between the mobile device and a second computing device, e.g., a remote display device. Generally, the mobile device establishes connectivity (e.g., wireless and/or wired connectivity) with the remote display device and communicates digital content to the remote display device for output. Accordingly, as part of the content connectivity session, content that is generated, displayed, and/or executed on the mobile device can be displayed on the remote display device, in whole or in part. For example, the mobile device is operable to cause the remote display device to display a graphical user interface of an application that is executed by the mobile device as part of the content connectivity session. In such an example, the mobile device can be leveraged to control functionality of the application, e.g., via input received via a touchscreen of the mobile device.

Consider an example in which the mobile device executes a gaming application with various "touchpoints." Generally, touchpoints represent spatial locations of a graphical user interface of the gaming application, such that actuation of a touchpoint causes a corresponding action to be performed within the gaming application. In this example, the gaming application is a car racing application that includes a touchpoint to accelerate a car within the gaming application, e.g., a "gas pedal" graphic as well as a touchpoint to slow down the car, e.g., a "brake pedal" graphic. As part of a gameplay session, a user of the mobile device wishes to utilize a larger display of the remote display device. Conventional techniques support "screen mirroring" that replicate content displayed on a smartphone on an external device. However, screen mirroring is computationally expensive, which introduces "lag" to gameplay as well as rapidly consumes battery resources.

Accordingly, the techniques described herein support generation of a guidance image to inform a user of one or more touchpoints of the application content, while conserving computational resources by terminating display of the guidance image during gameplay. To do so, the mobile device is operable to capture a screenshot of the digital content displayed by the remote display device. The screenshot, for instance, is a still image that depicts the user interface of the gaming application. Accordingly, in this example, the screenshot depicts a "moment in time" of the gaming application and includes the gas button graphic and well as the brake pedal graphic.

Based on the screenshot, the mobile device generates a guidance image that indicates a spatial location of the touchpoints of the gaming application. Generally, the guidance image depicts the screenshot, such as to indicate where the one or more touchpoints are located. In an example, the mobile device is operable to adjust the aspect ratio of the screenshot to configure the guidance image for display by the mobile device. In this way, the techniques described herein maximize a viewable area of the application displayed on the remote display device as well as a "playable area" of the mobile device.

In some implementations, the guidance image includes additional content. For instance, the mobile device is operable to identify visual features associated with the touchpoints and generate digital content to "highlight" the touchpoints. In an alternative or additional example, the mobile device applies a visual filter such as a transparency filter to the screenshot, such as to visually differentiate from a screen mirroring implementation. In this way, the guidance image is configurable in a variety of different ways to identify various touchpoints of the gaming application.

Once generated, the mobile device is operable to display the guidance image in a user interface. Continuing the example above, the guidance image includes a screenshot of the car racing application and depicts the touchpoints, such as the gas button graphic and well as the brake pedal graphic. The guidance image is further configured with additional content, such as one or more labels to indicate that the gas button graphic and the brake pedal graphic are touchpoints. Thus, the guidance image informs a user of the mobile device the locations of the gas button graphic and the brake pedal graphic.

Generally, during a gameplay session a user of the mobile device directs his attention to the remote display device that is displaying the gaming application. Accordingly, the mobile device is operable to terminate display of the guidance image based on a variety of considerations to conserve computational resources. In one example, the mobile device displays the guidance image for a set amount of time, e.g., one minute, to allow the user sufficient time to become familiar with the touchpoints of the gaming application. In another example, the mobile device terminates display of the guidance image upon receiving a proximity-based input, e.g., a user touch input, to a touchscreen of the mobile device. For instance, the user may observe the guidance image until he is ready to begin playing the game. Upon "touching" the screen of the mobile device, the guidance image is removed from display.

In various examples, the mobile device is operable to "recall" the guidance image for display, such as to "remind" the user where the touchpoints are located. In various examples, the mobile device updates the guidance image, e.g., based on an updated screenshot of the digital content displayed by the remote display device. In some examples, the mobile device periodically displays the guidance image, e.g., at predefined time intervals such as at 30 second intervals. In additional or alternative examples, the mobile device recalls the guidance image responsive to a user request. In at least one embodiment, the guidance image is recalled based on a determination that the user is looking at the display screen of the mobile device.

In some implementations, the mobile device is operable to recall the guidance image based on a monitored user interaction with the gaming application. For instance, the mobile device detects instances of proximity-based input, e.g., instances of user touch input. The mobile device is configured to recognize "off-target" instances of proximity-based input, such as user touch inputs that do not correspond to touchpoints. For instance, the proximity-based input indicates that the user has forgotten where the touchpoints are located. Accordingly, the mobile device is operable to recall the guidance image based on the detection of the off-target instances of proximity-based input to remind the user of the touchpoints.

Accordingly, using the techniques described herein, the mobile device is operable to conserve computational resources and create an enhanced user experience by generating a guidance image that depicts one or more touchpoints of a gaming application.

While features and concepts of guidance image generation for a mobile device can be implemented in any number of environments and/or configurations, aspects of the described techniques are described in the context of the following example systems, devices, and methods. Further, the systems, devices, and methods described herein are interchangeable in various ways to provide for a wide variety of implementations and operational scenarios.

FIG. 1 illustrates an example environment 100 in which aspects of guidance image generation for a mobile device can be implemented. The environment 100 includes a mobile device 102 and a display device 104 which are interconnectable by a network 106 to enable content from the mobile device 102 to be displayed by the display device 104, for instance as part of a content connectivity session. In this particular example, the mobile device 102 represents a portable device that can be carried by a user 108, such as a smartphone or a tablet device. Further, the display device 104 represents a remote display device such as a laptop computer, external monitor, smart television screen, a desktop computer, augmented reality ("AR) and/or virtual reality ("VR") devices (e.g., AR/VR glasses, projectors, headsets, etc.), and so forth. These examples are not to be construed as limiting, however, and the mobile device 102 and/or the display device 104 can be implemented in a variety of different ways and form factors. Example attributes of the mobile device 102 and the display device 104 are discussed below with reference to the device 700 of FIG. 7.

The mobile device 102 includes various functionality that enables the mobile device 102 to perform different aspects of guidance image generation for a mobile device discussed herein, including a mobile connectivity module 110, input mechanisms 112, one or more applications 114, and a content control module 116. The mobile connectivity module 110 represents functionality (e.g., logic and hardware) for enabling the mobile device 102 to interconnect with other devices and/or networks, such as the display device 104 and the network 106. The mobile connectivity module 110, for instance, enables wireless and/or wired connectivity of the mobile device 102.

The input mechanisms 112 represent functionality for enabling input to the mobile device 102, such as user input to invoke functionality of the mobile device 102. The input mechanisms 112, for instance, include an input surface 118 and a digitizer 120. Generally, the input surface 118 represents functionality for receiving proximity-based input to the mobile device 102, such as stylus input, user touch input, contactless input based on proximity of a user's finger and/or a stylus to the mobile device 102, and so forth. In various examples, the input surface 118 includes one or more touch sensors. The input surface 118, for example, is implemented via a display screen 122 of the mobile device 102 that is interconnected with the digitizer 120, such as a "touchscreen" of the mobile device 102. For instance, the digitizer 120 receives input to the display screen 122 and converts the input into digital signals that are utilized by the mobile device 102 as input signals.

The one or more applications 114 represent functionality for performing different computing tasks via the mobile device 102, such as gaming (e.g., mobile and/or touch-based gaming), media consumption (e.g., content streaming), productivity tasks (e.g., word processing, content generation, data analysis, etc.), web browsing, communication with other devices, and so forth. The content control module 116 represents functionality for performing various aspects of guidance image generation for a mobile device described herein. Generally, the content control module 116 is operable to generate a guidance image 124, for instance for display by the display screen 122. As further detailed below, for instance, the guidance image 124 is displayed on the display screen 122 and depicts a screenshot of digital content from instances of the applications 114.

The content control module 116 is further operable to generate digital content to be displayed by the display device 104, such as including digital content from instances of the applications 114. The content control module 116 includes a device interface module 126a that represents functionality for enabling the mobile device 102 to interface with other devices. As further detailed below, the device interface module 126a enables the mobile device 102 to establish wireless and/or wired data communication with other devices, e.g., the display device 104, as part of a content connectivity session.

The display device 104 represents functionality for various types of content output, such as output of visual and audible content. The display device 104 can be implemented in various ways, such as a television (e.g., a smart TV), a display panel, a projector display, a computing device with an associated display device, an external monitor, and so forth. In at least one implementation the display device 104 represents a dedicated display device configured to output visual content generated by other devices, such as content generated at the mobile device 102 and transmitted to the display device 104 for display. Alternatively or additionally, the display device 104 includes computing functionality.

The display device 104 includes various functionality for enabling the display device 104 to output content such as content received from the mobile device 102, including a device interface module 126b, a device connectivity module 128, and an output module 130. The device connectivity module 128 represents functionality (e.g., logic and hardware) for enabling the display device 104 to interconnect with other devices and/or networks, such as the mobile device 102 and the network 106. The device connectivity module 128, for instance, enables wireless and/or wired connectivity of the display device 104 such as for receiving content from other devices for display. In at least one implementation the device connectivity module 128 connects to the network 106 (e.g., via wireless and/or wired connectivity) for intercommunication with other devices and/or networks. Alternatively or additionally the device connectivity module 128 enables direct device-to-device connectivity with other devices, such as the mobile device 102. The mobile connectivity module 110 of the mobile device 102 and the device connectivity module 128 of the display device 104, for instance, are configured to communicate via a variety of different wireless protocols, such as Wireless Local Area Network (WLAN) (e.g., Wi-Fi), Wi-Fi Direct, wireless short distance communication (e.g., Bluetooth™ (including BLE), Near Field Communication (NFC)), and so forth.

The output module 130 represents functionality for enabling content output by the display device 104, such as visual content and audible content. The output module 130, for instance, includes a display driver and/or other logic and hardware to output content by the display device 104. The device interface module 126b is representative of functionality for enabling the display device 104 to interface with other devices. For instance, the device interface module 126b interfaces with the device interface module 126a of the mobile device 102 to enable collaborative data communication between the display device 104 and the mobile device 102. In at least one implementation the device interface module 126b is optional to the display device 104.

Having discussed an example environment in which the disclosed techniques can be performed, consider now some example scenarios and implementation details for implementing the disclosed techniques.

Figure 2:
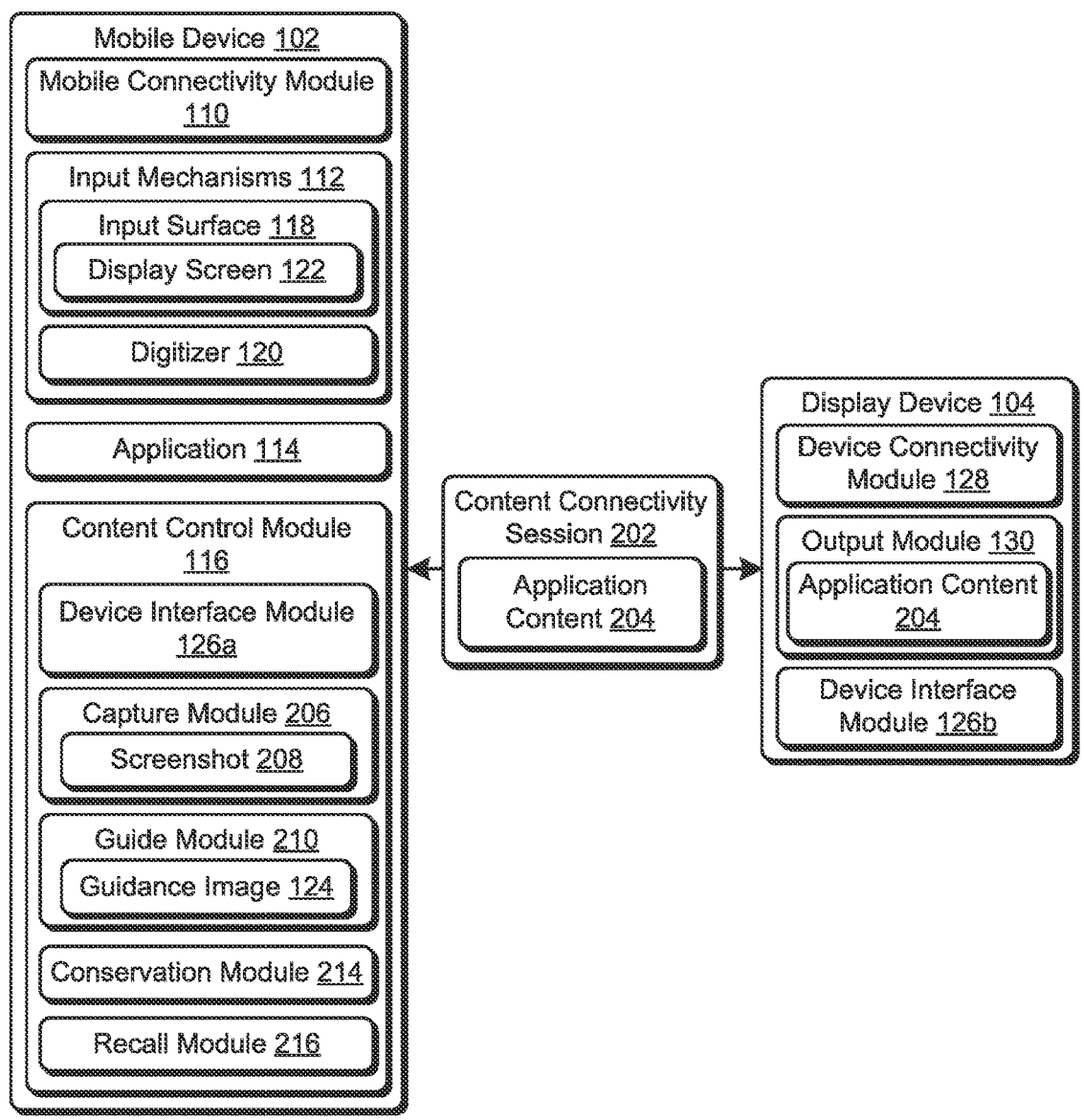
FIG. 2 depicts an example system for guidance image generation for a mobile device in accordance with one or more implementations.

FIG. 2 depicts an example system 200 for guidance image generation for a mobile device in accordance with one or more implementations. The system 200 can be implemented in the environment 100 and incorporates attributes of the environment 100 introduced above.

In the example system 200, a content connectivity session 202 is established between the mobile device 102 and the display device 104. The content connectivity session 202, for instance, enables the mobile device 102 to transmit content to the display device 104 for output via wireless and/or wired connectivity. In at least one implementation the content connectivity session 202 is established via negotiation between the mobile connectivity module 110 and the device connectivity module 128. Alternatively or additionally, the content connectivity session 202 is established via communication between the device interface module 126a and the device interface module 126b.

In various examples, the content connectivity session 202 is initiated by a user 108, for instance responsive to a user prompt displayed by the display screen 122. In alternative or additional examples, the content connectivity session 202 is established automatically and without user intervention, such as responsive to an application 114 being launched by the mobile device 102 and/or detection of the display device 104 in proximity to the mobile device 102. In an example, the application 114 is a mobile gaming application, however this is by way of example and not limitation and the techniques described herein are extensible to a variety of types of applications.

As part of the content connectivity session 202, the mobile device 102 can display digital content from the application 114 via the display screen 122 as well as generate application content 204 to be communicated to the output module 130 for display. The mobile device 102 is operable to edit the application content 204 such that the application content 204 may be effectively displayed by the display device 104, e.g., adjusting an aspect ratio and/or resolution of the application content 204.

In an example, the mobile device 102 launches the application 114 and communicates application content 204 to the display device 104 for display. In this example, the display device 104 displays digital content from the application 114 and the mobile device 102 controls functionality of the application 114 as part of the content connectivity session 202. The mobile device 102 includes a capture module 206 that is operable to capture a screenshot 208 of the digital content displayed by the display device 104, such as the application content 204. The screenshot 208, for instance, is a raster and/or vector image that depicts a user interface of the application 114 at a moment in time.

Based on the screenshot 208, a guide module 210 is operable to generate a guidance image 124 that indicates one or more touchpoints of the application 114. The one or more touchpoints represent spatial locations of a graphical user interface of the application 114, such that actuation of a touchpoint causes a corresponding action to be performed within the application 114. For instance, in an example in which the application 114 is a gaming application, the control region corresponds to an "actuatable" area surrounding one or more of an action button, directional pad, digital joystick, etc. displayed by the gaming application. In another example in which the application 114 is a media consumption application, the one or more touchpoints include an actuatable area represented by volume buttons, channel buttons, and navigation controls such as to play, pause, fast forward, rewind, and so forth.

Generally, the guidance image 124 depicts the screenshot 208, such as to indicate where the one or more touchpoints are located. In one example, the guide module 210 is operable to adjust the aspect ratio of the screenshot 208 to configure the guidance image 124 for display by the mobile device 102. For instance, the guide module 210 adjusts the length, width, and/or scaling of the screenshot 208 such that the touchpoints as defined by the mobile device 102 correspond to visual graphics of the screenshot 208. In this way, the guide module 210 can ensure that the aspect ratio of the guidance image 124 is synchronized with an aspect ratio of the display device 104.

In some implementations, the guide module 210 generates additional content to supplement the screenshot 208 as part of generating the guidance image 124. For instance, the guide module 210 is operable to identify visual features associated with the touchpoints and generate digital content to "highlight" the touchpoints. The guide module 210 can employ a variety of techniques to identify visual features associated with the touchpoints, such as employing one or more image recognition algorithms and/or machine-learning models, based on metadata associated with the application 114, etc. Consider an example in which the application 114 is a gaming application that includes a joystick to control various functionality. The guide module 210 is operable to determine that the joystick is a touchpoint, and generate content to identify the joystick as such. For instance, the guide module 210 can generate text labels, icons, arrows, supplemental image content, highlight various regions of the screenshot 208, and/or remove portions and/or features of the screenshot 208 using a variety of image segmentation techniques as part of generation of the guidance image 124.

In one example, the guide module 210 applies one or more visual filters to the screenshot 208, such as to visually differentiate the guidance image 124 from a screen mirroring implementation. For instance, the guide module applies a transparency filter to the screenshot 208 as part of generating the guidance image 124. In at least one example, the guide module 210 is operable to apply the one or more visual filters to portions of the screenshot 208 that do not correspond to the one or more touchpoints, e.g., such that the touchpoints do not appear transparent in the guidance image 124 as further discussed below with respect to FIG. 4. Accordingly, the guidance image 124 is configurable in a variety of different ways to identify various touchpoints of the application 114.

Once generated, the mobile device 102 is operable to display the guidance image 124, such as by the display screen 122. In one example, the mobile device 102 is configured to display the guidance image 124 for the duration that the application 114 is executed by the mobile device 102 and/or for the duration of the content connectivity session 202. Alternatively, a conservation module 214 is operable to terminate display of the guidance image 124 based on a variety of considerations.

In one example, the conservation module 214 terminates display of the guidance image 124 after a predetermined period of time, e.g., one minute, to allow the user sufficient time to become familiar with the touchpoints of the application 114. In at least one example, the period of time is based on one or more user preferences, such as user defined and/or based on a previous content connectivity session. For instance, the conservation module 214 is operable to determine, based on one or more previous content connectivity sessions, a sufficient length of time for a particular user to become familiar with touchpoints of a particular application.

In another example, the conservation module 214 terminates display of the guidance image 124 upon receiving a proximity-based input, such as stylus input, user touch input, interaction with a touchscreen and/or input surface 118 of the mobile device 102, a contactless input based on proximity of a user's finger and/or a stylus to the mobile device 102, and so forth. In an example, a user of the mobile device 102 may observe the guidance image 124 until she is familiar with the touchpoints. The user delivers a proximity-based input, such as by touching the screen of the mobile device 102, and the conservation module 214 terminates display of the guidance image 124.

Once the guidance image 124 is no longer displayed, the display screen 122 may instead display a blank screen. The display screen 122 is configured, as part of the content connectivity session 202, to control functionality of the application 114, e.g., via receipt of proximity-based inputs to the one or more touchpoints. In some examples, the display screen 122 includes a selectable option to recall the guidance image 124 as further discussed below. In this way, computational resources that would otherwise be used to display digital content by the display screen 122 can be reallocated by the mobile device 102, such as to various processing tasks associated with execution of the application 114. Thus, the mobile device 102 conserves computational resources and results in an enhanced user experience.

The mobile device 102 further includes a recall module 216 that is operable to recall the guidance image 124 for display. In one example, the recall module 216 recalls the guidance image 124 responsive to a user request. For instance, as mentioned above, once the guidance image 124 is initially dismissed the display screen 122 can include a selectable option to recall the guidance image 124. Upon receipt of proximity-based input (e.g., a user touch) to select the selectable option, the recall module 216 is operable to display the guidance image 124.

The recall module 216 can further display the guidance image 124 at predefined time intervals, e.g., every 30 seconds. In some implementations, the recall module 216 calculates a recall rate to determine a frequency that the guidance image 124 is to be recalled for display. The recall rate can be based on a variety of factors and/or considerations. For instance, the recall module 216 recalls the guidance image 124 for display with decreasing frequency as the content connectivity session 202 continues. Consider an example in which the application 114 is a gameplay application. As a user continues to interact with the gaming application, the user becomes familiar with the touchpoints and thus is less likely to rely on the guidance image 124 for support. Accordingly, the guidance image 124 is recalled with reduced frequency, e.g., by reducing the recall rate.

In at least one example, the recall module 216 recalls the guidance image 124 based at least in part on a monitored user interaction with the application 114. In an example, the application is a gaming application and the recall module 216 recalls the guidance image 124 based on "how well" the user is playing the gaming application. For instance, the recall module 216 detects that a user has gotten a "high score" and thus decreases the frequency that the guidance image 124 is recalled. Alternatively, the recall module 216 detects that the user is struggling to make progress with the gaming application and thus increases the frequency that the guidance image 124 is displayed, e.g., by increasing the recall rate.

In another example, the recall module 216 recalls the guidance image 124 for display based on detection of one or more off-target instances of proximity-based input as part of a user interaction with the application 114. For instance, the recall module 216 detects instances of proximity-based input, e.g., instances of user touch input. The recall module 216 is configured to recognize "off-target" instances of proximity-based input, such as user touch inputs that do not correspond to touchpoints. For example, the off-target proximity-based input indicates that the user has forgotten where the touchpoints are located.

Accordingly, the recall module 216 is operable to recall the guidance image 124 and/or increase the frequency that the guidance image 124 is recalled based on the detection of the off-target instances of proximity-based input, such as to remind the user of the touchpoints. Alternatively, the recall module 216 can decrease the frequency that the guidance image 124 is recalled based on detection of one or more on-target instances of proximity-based input, such as user touch inputs that correspond to touchpoints. In at least one example, the recall module 216 calculates a ratio, e.g., an on-target ratio, of on-target instances of proximity-based input to off-target instances of proximity-based input, and the recall rate is based at least in part on the on-target ratio.

In at least one embodiment, the guidance image 124 is recalled based on a determination that the user is looking at the display screen 122 of the mobile device 102. For instance, the recall module 216 leverages gaze recognition/tracking software and/or hardware to determine that a user's gaze is directed at the display screen 122. In an example, a user gaze directed at the display screen 122 indicates that the user has forgotten the touchpoints, and is looking at the display screen 122 to be reminded of the touchpoints. Accordingly, the recall module 216 can display the guidance image 124 based in whole or in part on the gaze determination.

In another example, the guidance image 124 is recalled based on a determination that one or more of the touchpoints of the application 114 have changed, such as a change in one or more of a location, size, appearance, number, position, etc. of the touchpoints. Further, the change can include addition and/or removal of one or more touchpoints. Consider an example in which the application 114 is a gaming application. In accordance with gameplay the touchpoints have changed, for instance a position of an action button of the gaming application has moved. Accordingly, the recall module 216 is operable to detect the change to the touchpoints and display the guidance image 124 responsive to the detection.

In some instances, recall of the guidance image 124 includes generation of an updated guidance image. For instance, the recall module 216 is operable to leverage functionality of the capture module 206 and the guide module 210 to update the guidance image 124, such as based on and/or including an updated screenshot. For instance, the updated screenshot represents a "recent" depiction of the user interface of the application 114. Continuing the example above in which the touchpoints have changed, the updated guidance image is configured based on an updated screenshot to reflect the change in position of the action button. In this way, the guidance image 124 supports implementations with dynamic gameplay. Accordingly, using the techniques described herein, the mobile device 102 creates an intuitive and efficient user experience by generating a guidance image 124 that depicts one or more touchpoints of a gaming application, terminating display of the guidance image 124 to conserve computational resources, and recalling the guidance image 124 based on a variety of factors.

Figure 3A:
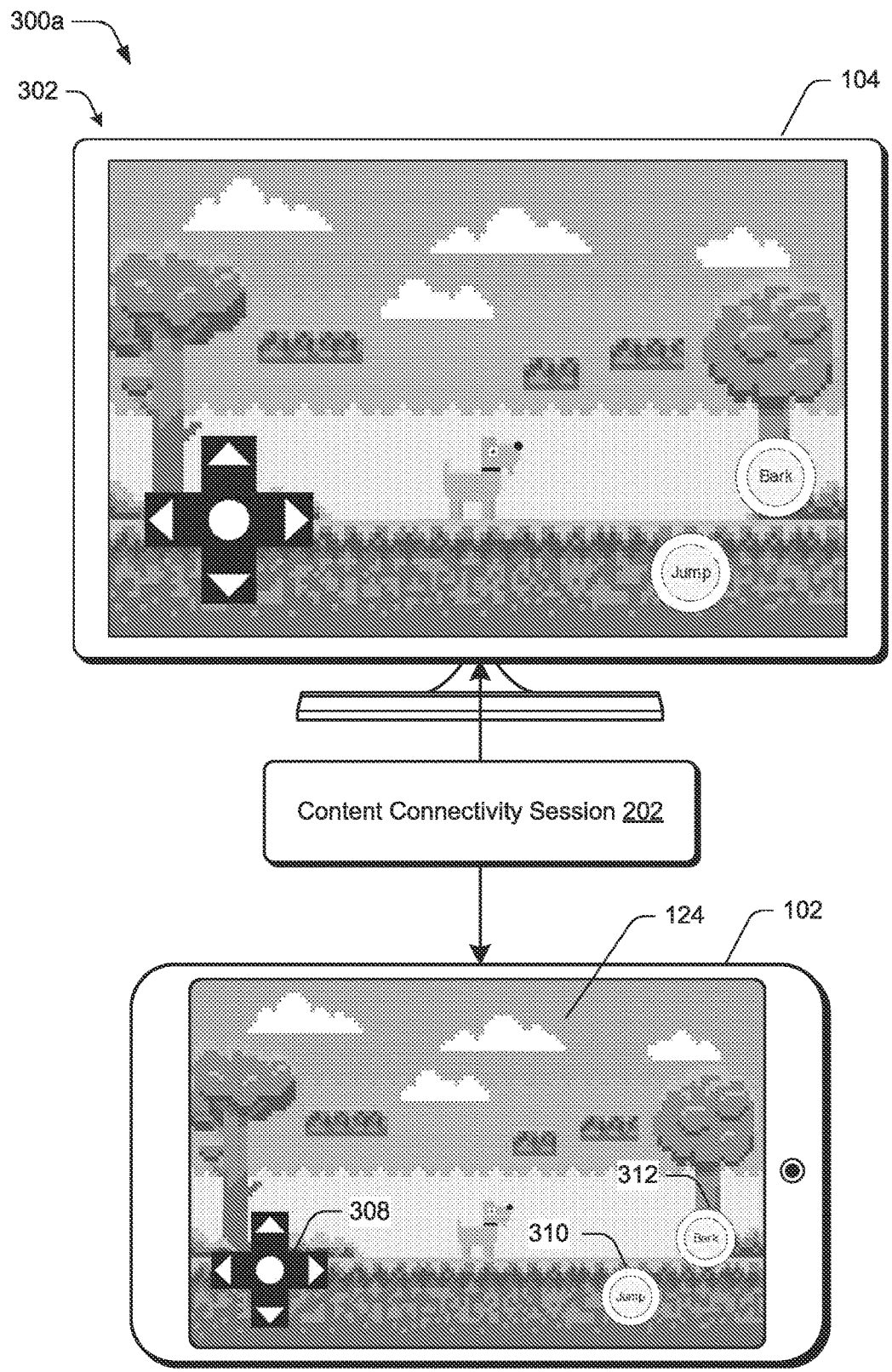
FIGS. 3a, 3b, and 3c depict an example implementation for guidance image generation for a mobile device in accordance with one or more implementations.
Figure 3B:
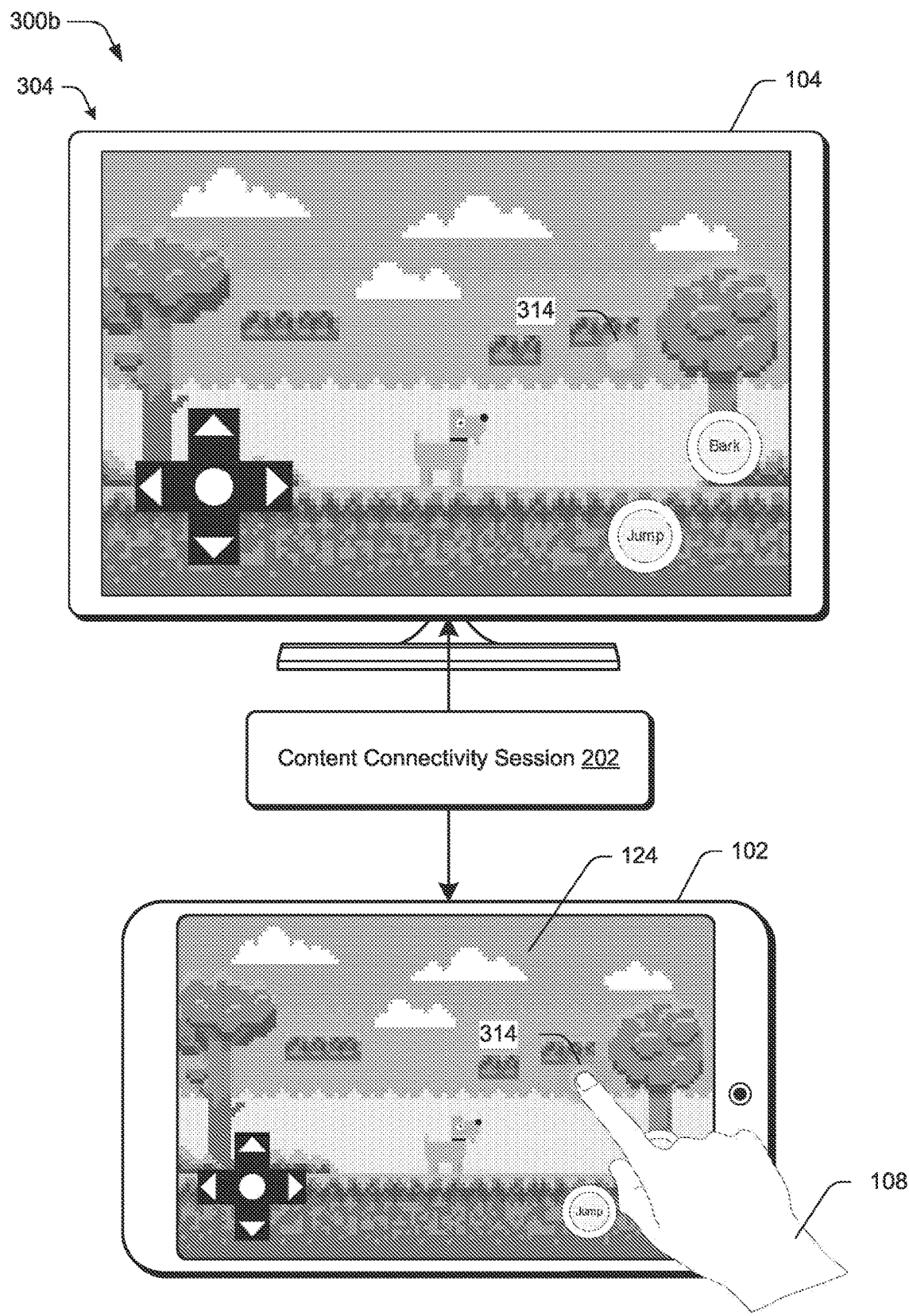
Figure 3C:
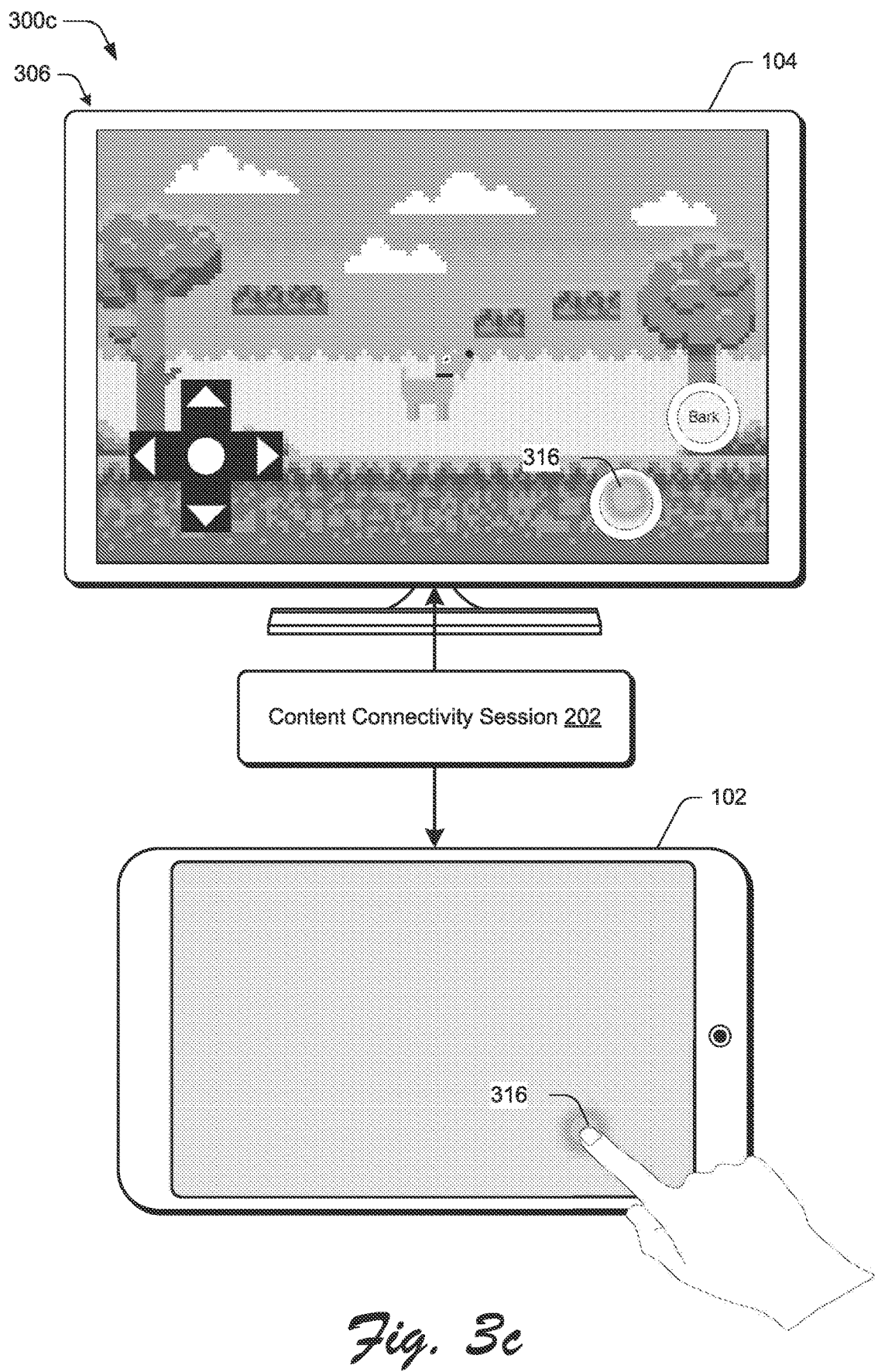

FIGS. 3a, 3b, and 3c depict an example implementation 300a, 300b, and 300c for guidance image generation for a mobile device in accordance with one or more implementations. In this example, shown in first stage 302, second stage 304, and third stage 306, the mobile device 102 is operable to generate a guidance image 124 for an application 114, which in this example is a gaming application involving control of an avatar such as a dog. As shown in first stage 302, a mobile device 102 establishes a content connectivity session 202 between the mobile device 102 and a display device 104. As part of the content connectivity session 202, the mobile device 102 executes the gaming application and causes the display device 104 to display digital content from the gaming application.

In accordance with the techniques described herein, the mobile device 102 captures a screenshot 208 of the digital content displayed by the display device 104 and based on the screenshot 208 generates a guidance image 124 for display by the mobile device 102. In this example, generation of the guidance image 124 includes adjustment of an aspect ratio of the screenshot 208 to configure the guidance image 124 for display by the mobile device 102. Thus, as shown in first stage 302, the guidance image 124 represents the content depicted by the display device 104 and includes various touchpoints, such as a directional pad 308, a jump button 310, and a bark button 312.

As depicted in second stage 304, the mobile device 102 receives an instance of proximity-based input. For instance, the proximity-based input is a user input 314 to touch the display screen 122. The user input 314 is further depicted as a gray circle in a corresponding location of the display device 104. In this example, a user 108 of the mobile device 102 has reviewed the guidance image 124 and has become familiar with the touchpoints of the gaming application, such as the directional pad 308, the "jump" button 310, and the "bark" button 312.

As illustrated in third stage 306, the mobile device 102 terminates display of the guidance image 124 responsive to detection of the user input 314. For instance, the display screen 122 of the mobile device 102 displays a blank screen instead of the guidance image 124. Accordingly, as part of the content connectivity session 202, the user 108 is able to use the mobile device 102 as a "controller" to control functionality of the gaming application displayed by the display device 104 with reduced consumption of computational resources. As depicted, for instance, the user 108 provides a second user input 316 to a touchpoint that corresponds to the jump button 310. Accordingly, within the gaming application the dog jumps.

Figure 4:
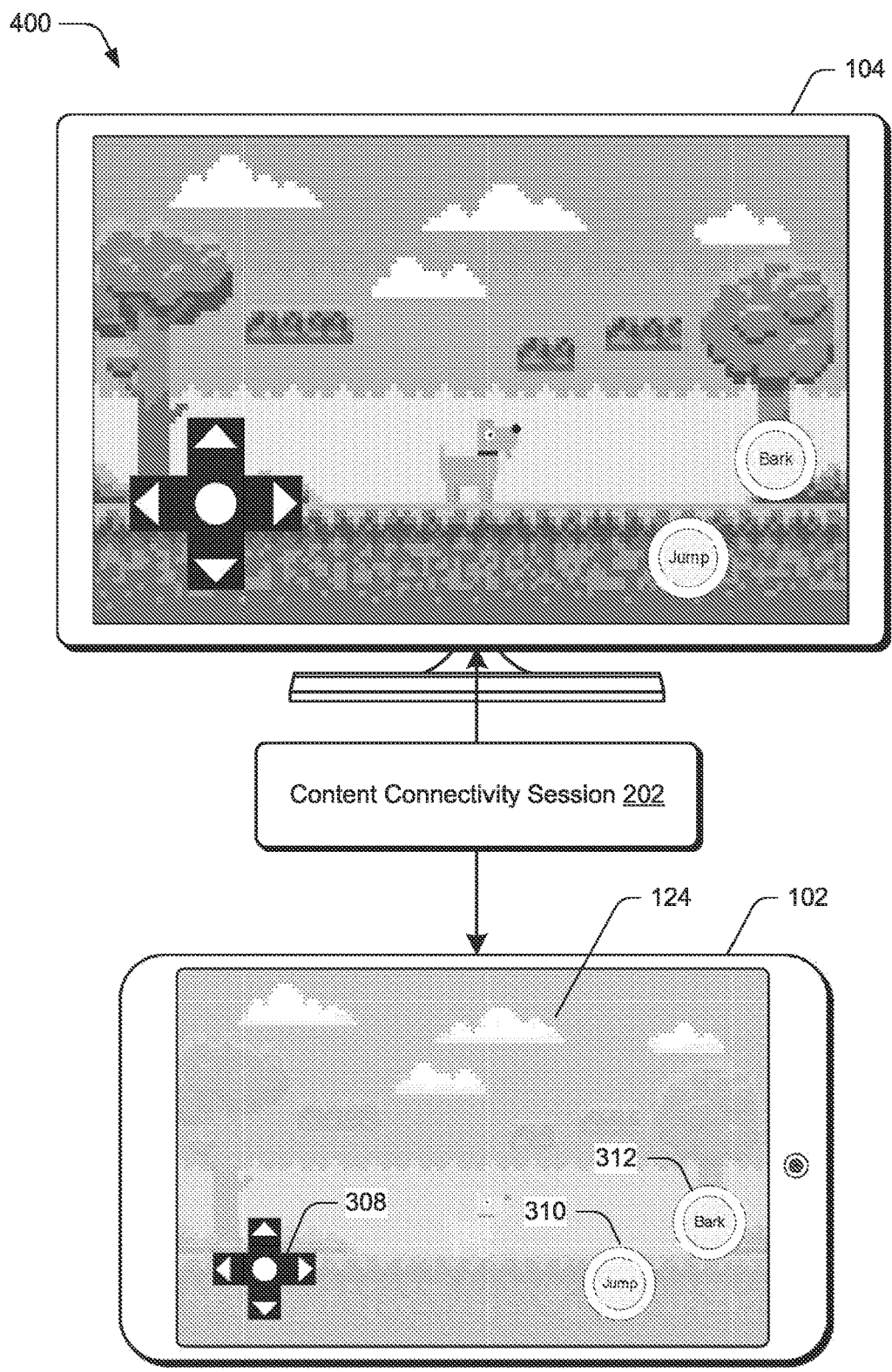
FIG. 4 depicts an example implementation for guidance image generation for a mobile device including editing a screenshot to generate a guidance image in accordance with one or more implementations.

FIG. 4 depicts an example implementation 400 for guidance image generation for a mobile device including editing a screenshot to generate a guidance image. In this example, a mobile device 102 establishes a content connectivity session 202 between the mobile device 102 and a display device 104. As part of the content connectivity session 202, the mobile device 102 executes an application, which in this instance is the gaming application described above with respect to FIGS. 3a, 3b, and 3c. The mobile device 102 is operable to capture a screenshot 208 of the digital content displayed by the display device 104 in accordance with the techniques described herein.

Based on the screenshot 208, the mobile device 102 is operable to generate a guidance image 124. In this example, the mobile device applies a transparency filter to the screenshot 208 to differentiate the guidance image 124 from a screen mirroring implementation. That is, application the transparency filter indicates to a user of the mobile device 102 that the guidance image 124 is not a screen mirroring implementation.

Further, the mobile device 102 is operable to identify touchpoints of the gaming application, such as based on an image recognition algorithm. In this example, the touchpoints include the directional pad 308, the jump button 310, and the bark button 312. The mobile device 102 applies the transparency filter to portions of the screenshot 208 that do not correspond to the touchpoints, e.g., the digital content except for the directional pad 308, the jump button 310, and the bark button 312, for instance by leveraging an image segmentation technique. In this way, the touchpoints "stand out" in the guidance image 124 and are easily identifiable by a user of the mobile device 102.

Figure 5:
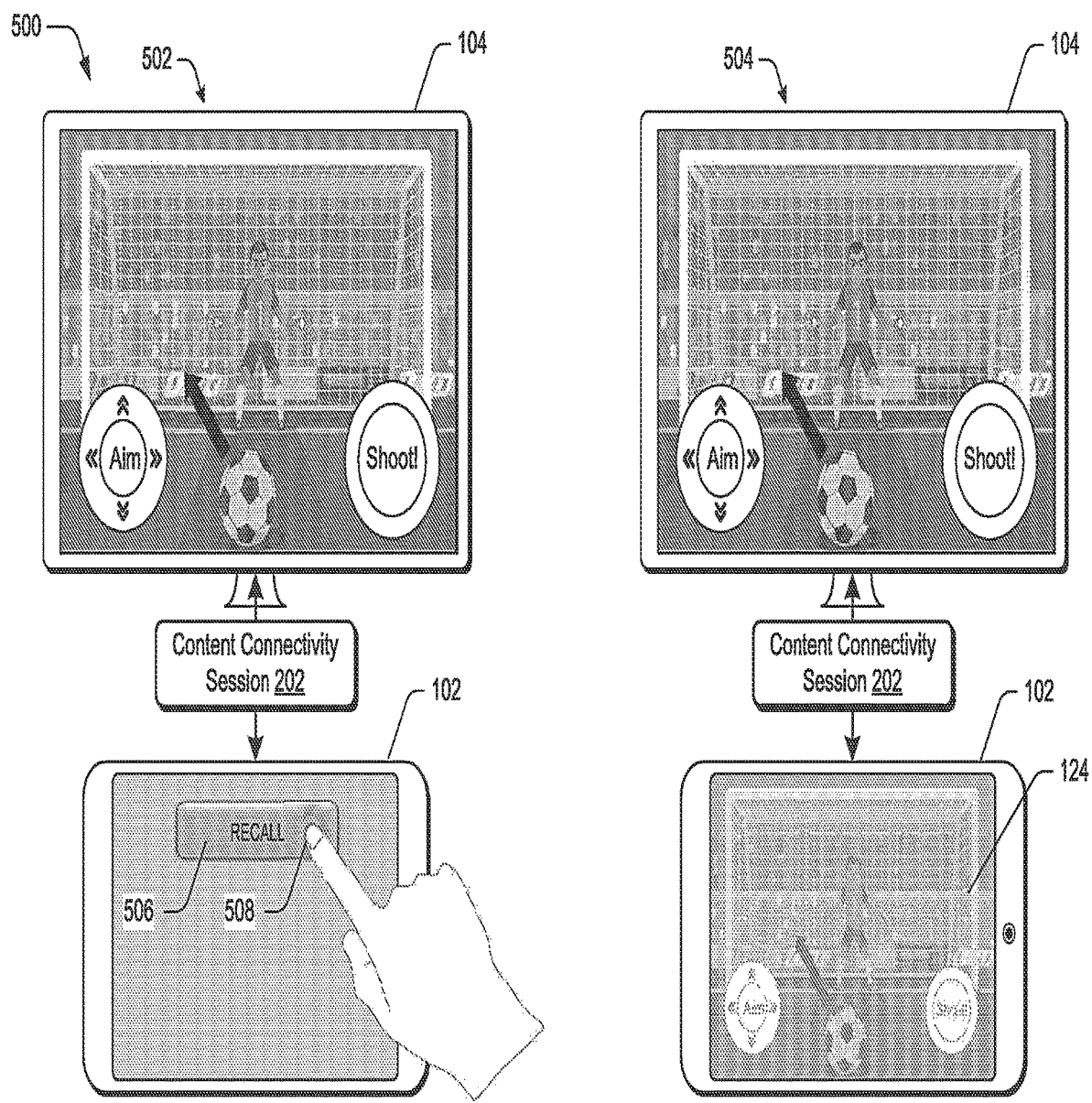
FIG. 5 depicts an example implementation for guidance image generation for a mobile device including recalling the guidance image in accordance with one or more implementations.

FIG. 5 depicts an example implementation 500 for guidance image generation for a mobile device including recalling the guidance image in a first stage 502 and a second stage 504. In this example, a mobile device 102 has established a content connectivity session 202 between the mobile device 102 and a display device 104. As part of the content connectivity session 202, the mobile device 102 executes an application, which in this example is a soccer gaming application. Although not depicted, in this example the mobile device 102 is operable to capture a screenshot 208, generate a guidance image 124, and terminate display of the guidance image 124, for instance based on receipt of proximity-based input.

As depicted in first stage 502, subsequent to termination of display of the guidance image 124, the display screen 122 includes a selectable option 506 to recall the guidance image 124. The mobile device 102 receives an instance of proximity-based input, such as a user input 508 to actuate the selectable option 506. As shown in second stage 504, responsive to the user input 508, the mobile device 102 recalls the guidance image 124 for display. In this example, recall of the guidance image 124 includes generating an updated guidance image, such as based on an updated screenshot. Further, the mobile device 102 applies a transparency filter to the updated screenshot to generate the updated guidance image, for instance to further differentiate from a screen-mirroring implementation. Accordingly, using the techniques described herein, a user of the mobile device is able to be reminded of touchpoints of the soccer gaming application such as an aim graphic and a shoot graphic.

Figure 6:
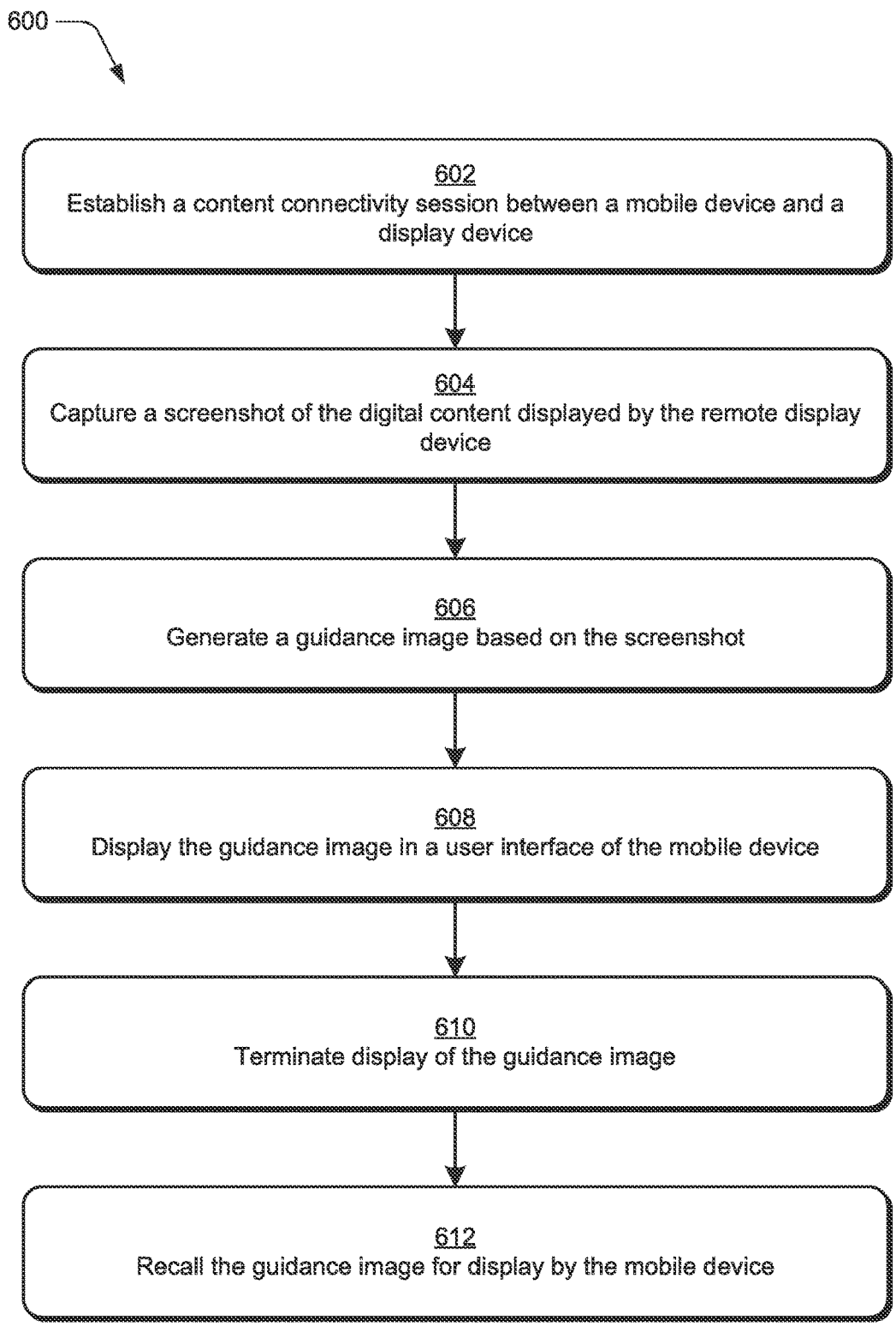
FIG. 6 illustrates a flow chart depicting an example method for guidance image generation for a mobile device in accordance with one or more implementations.

FIG. 6 illustrates a flow chart depicting an example method 600 for guidance image generation for a mobile device in accordance with one or more implementations. At 602, a content connectivity session is established between a mobile device and a display device. The content connectivity session 202, for instance, enables the mobile device 102 to transmit digital content to the display device 104 for output via wireless and/or wired connectivity. In an example, the mobile device 102 executes an application 114 and communicates digital content from the application 114 for display by the display device 104. The mobile device controls functionality of the application as part of the content connectivity session 202.

At 604, a screenshot of the digital content displayed by the display device is capture. The screenshot 208, for instance, is a raster and/or vector image that depicts a user interface of the application 114 at a moment in time. The mobile device 102 can leverage a variety of suitable techniques to capture the screenshot 208.

At 606, a guidance image is generated based on the screenshot. The guidance image 124, for instance, indicates one or more touchpoints of the application 114. Generally, the one or more touchpoints represent spatial locations of a graphical user interface of the application 114, such that actuation of a touchpoint causes a corresponding action to be performed within the application 114. In some examples, generation of the guidance image 124 includes applying a visual filter, e.g., a transparency filter, to the screenshot. In another example, the guidance image 124 includes additional digital content to identify the one or more touchpoints, such as text labels, icons, arrows, supplemental digital content, highlighted areas, removed portions and/or features of the screenshot 208, etc.

At 608, the guidance image is displayed in a user interface of the mobile device. As part of displaying the guidance image 124, the mobile device 102 is operable to adjust an aspect ratio of the screenshot 208 and/or guidance image 124 to configure the guidance image 124 for display by the mobile device 102. In one example, the mobile device 102 is configured to display the guidance image 124 for the duration that the application 114 is executed by the mobile device 102 and/or for the duration of the content connectivity session 202. Alternatively, the mobile device 102 dismisses the guidance image 124 based on one or more of a variety of factors.

At 610, display of the guidance image is terminated. In an example, the mobile device 102 terminates display of the guidance image 124 after a predetermined period of time. In another example, the mobile device 102 terminates display of, e.g., dismisses, the guidance image 124 upon receipt of an instance of proximity-based input, e.g., a user touch input. Once the guidance image 124 is no longer displayed, the display screen 122 of the mobile device 102 may instead display a blank screen. The display screen 122 is configured, as part of the content connectivity session 202, to control functionality of the application 114, e.g., via receipt of proximity-based inputs to the one or more touchpoints.

At 612, the guidance image is recalled for display by the mobile device. The mobile device 102 is operable to recall the guidance image 124 based on a variety of factors. In one example, the mobile device 102 recalls the guidance image 124 responsive to a user input to recall the guidance image 124. In another example, the mobile device 102 recalls the guidance image 124 at a predetermined time interval, e.g., every 30 seconds. In some implementations, the mobile device 102 adjusts a frequency that the guidance image 124 is recalled, such as based on calculated recall rate. The recall rate can be based on a variety of factors, such as the length of the content connectivity session 202 and/or a monitored user interaction with the application 114.

In one example, the mobile device 102 recalls the guidance image 124 based on detection of one or more off-target instances of proximity-based input as part of a user interaction with the application 114. For instance, the recall module 216 detects instances of proximity-based input, e.g., instances of user touch input. The recall module 216 is configured to recognize "off-target" instances of proximity-based input, such as user touch inputs that do not correspond to touchpoints. For instance, the proximity-based input indicates that the user has forgotten where the touchpoints are located. Accordingly, the techniques described herein support an adaptive gameplay scenario that conserves computational resources and results in an enhanced user experience.

The example methods described above may be performed in various ways, such as for implementing different aspects of the systems and scenarios described herein. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 7:
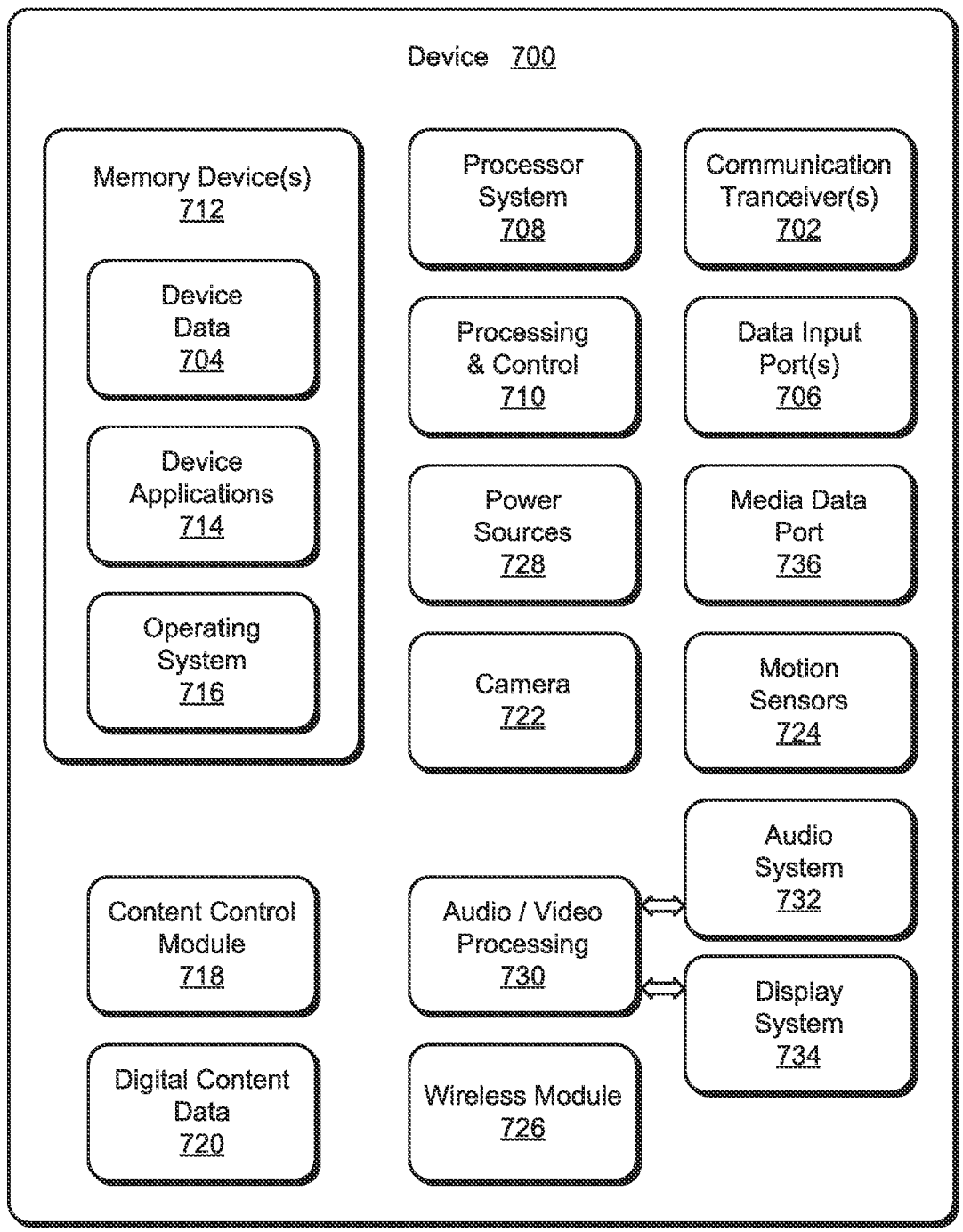
FIG. 7 illustrates various components of an example device in which aspects of guidance image generation for a mobile device can be implemented.

FIG. 7 illustrates various components of an example device 700 in which aspects of guidance image generation for a mobile device can be implemented. The example device 700 can be implemented as any of the devices described with reference to the previous FIGS. 1-6, such as any type of mobile device, mobile phone, mobile device, wearable device, tablet, computing, communication, entertainment, gaming, media playback, and/or other type of electronic device. For example, the mobile device 102 as shown and described with reference to FIGS. 1-6 may be implemented as the example device 700.

The device 700 includes communication transceivers 702 that enable wired and/or wireless communication of device data 704 with other devices. The device data 704 can include any of device identifying data, device location data, wireless connectivity data, and wireless protocol data. Additionally, the device data 704 can include any type of audio, video, and/or image data. Example communication transceivers 702 include wireless personal area network (WPAN) radios compliant with various IEEE 702.15 (Bluetooth™) standards, wireless local area network (WLAN) radios compliant with any of the various IEEE 702.11 (Wi-Fi™) standards, wireless wide area network (WWAN) radios for cellular phone communication, wireless metropolitan area network (WMAN) radios compliant with various IEEE 702.16 (WiMAX™) standards, and wired local area network (LAN) Ethernet transceivers for network data communication.

The device 700 may also include one or more data input ports 706 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 700 includes a processing system 708 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 710. The device 700 may further include any type of a system bus or other data and command transfer system that couples the various components within the device. A system bus can include any one or combination of different bus structures and architectures, as well as control and data lines.

The device 700 also includes computer-readable storage memory 712 (e.g., memory devices) that enable data storage, such as data storage devices that can be accessed by a computing device, and that provide persistent storage of data and executable instructions (e.g., software applications, programs, functions, and the like). Examples of the computer-readable storage memory 712 include volatile memory and non-volatile memory, fixed and removable media devices, and any suitable memory device or electronic data storage that maintains data for computing device access. The computer-readable storage memory can include various implementations of random-access memory (RAM), read-only memory (ROM), flash memory, and other types of storage media in various memory device configurations. The device 700 may also include a mass storage media device.

The computer-readable storage memory 712 provides data storage mechanisms to store the device data 704, other types of information and/or data, and various device applications 714 (e.g., software applications). For example, an operating system 716 can be maintained as software instructions with a memory device and executed by the processing system 708. The device applications may also include a device manager, such as any form of a control application, software application, signal-processing and control module, code that is native to a particular device, a hardware abstraction layer for a particular device, and so on. Computer-readable storage memory 712 represents media and/or devices that enable persistent and/or non-transitory storage of information in contrast to mere signal transmission, carrier waves, or signals per se. Computer-readable storage memory 712 do not include signals per se or transitory signals.

In this example, the device 700 includes a content control module 718 that implements aspects of guidance image generation for a mobile device and may be implemented with hardware components and/or in software as one of the device applications 714. In an example, the content control module 718 can be implemented as the content control module 116 described in detail above. In implementations, the content control module 718 may include independent processing, memory, and logic components as a computing and/or electronic device integrated with the device 700. The device 700 also includes digital content data 720 for implementing aspects of guidance image generation for a mobile device and may include data from and/or utilized by the content control module 718.

In this example, the example device 700 also includes a camera 722 and motion sensors 724, such as may be implemented in an inertial measurement unit (IMU). The motion sensors 724 can be implemented with various sensors, such as a gyroscope, an accelerometer, and/or other types of motion sensors to sense motion of the device. The various motion sensors 724 may also be implemented as components of an inertial measurement unit in the device.

The device 700 also includes a wireless module 726, which is representative of functionality to perform various wireless communication tasks. For instance, for the mobile device 102, the wireless module 726 can be leveraged to scan for and detect wireless networks, as well as negotiate wireless connectivity to wireless networks for the mobile device 102. The device 700 can also include one or more power sources 728, such as when the device is implemented as a mobile device. The power sources 728 may include a charging and/or power system, and can be implemented as a flexible strip battery, a rechargeable battery, a charged super-capacitor, and/or any other type of active or passive power source.

The device 700 also includes an audio and/or video processing system 730 that generates audio data for an audio system 732 and/or generates display data for a display system 734. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 736. In implementations, the audio system and/or the display system are integrated components of the example device. Alternatively, the audio system and/or the display system are external, peripheral components to the example device.

Although implementations of guidance image generation for a mobile device have been described in language specific to features and/or methods, the subject of the appended claims is not necessarily limited to the specific features or methods described. Rather, the features and methods are disclosed as example implementations of guidance image generation for a mobile device, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

In some aspects, the techniques described herein relate to a computing device, including: a content control module implemented at least partially in hardware and configured to: capture, by the computing device, a screenshot of digital content from a gaming application displayed by a remote display device as part of a content connectivity session between the computing device and the remote display device; generate a guidance image based on the screenshot, the guidance image indicating one or more touchpoints of the gaming application: display the guidance image in a user interface of the computing device as part of the content connectivity session; and terminate display of the guidance image responsive to receipt of proximity-based input to the computing device.

In some aspects, the techniques described herein relate to a computing device, wherein the computing device displays a blank screen configured to control functionality of the gaming application via the one or more touchpoints subsequent to termination of display of the guidance image.

In some aspects, the techniques described herein relate to a computing device, wherein to generate the guidance image includes adjusting an aspect ratio of the screenshot to configure the guidance image for display by the computing device.

In some aspects, the techniques described herein relate to a computing device, wherein to generate the guidance image includes applying a transparency filter to the screenshot.

In some aspects, the techniques described herein relate to a computing device, wherein the content control module is further configured to recall the guidance image subsequent to termination of display of the guidance image after a predetermined time interval.

In some aspects, the techniques described herein relate to a computing device, wherein the content control module is further configured to receive a user input to recall the guidance image subsequent to termination of display of the guidance image; and recall the guidance image for display responsive to the user input to recall the guidance image.

In some aspects, the techniques described herein relate to a computing device, wherein the content control module is further configured to detect one or more off-target instances of proximity-based input as part of a user interaction with the gaming application subsequent to termination of display of the guidance image; and recall the guidance image for display based on detection of the one or more off-target instances of proximity-based input.

In some aspects, the techniques described herein relate to a computing device, wherein the guidance image includes the screenshot and additional content to identify the one or more touchpoints of the gaming application.

In some aspects, the techniques described herein relate to a method, including: capturing, by a mobile device, a screenshot of digital content from an application displayed by a remote display device as part of a content connectivity session between the mobile device and the remote display device: generating a guidance image based on the screenshot, the guidance image indicating one or more touchpoints of the application: displaying the guidance image in a user interface of the mobile device as part of the content connectivity session: receiving proximity-based input to the user interface of the mobile device; and terminating display of the guidance image responsive to receipt of the proximity-based input.

In some aspects, the techniques described herein relate to a method, wherein the mobile device displays a blank screen configured to control functionality of the application via the one or more touchpoints subsequent to termination of display of the guidance image.

In some aspects, the techniques described herein relate to a method, wherein generating the guidance image includes adjusting an aspect ratio of the screenshot to configure the guidance image for display by the mobile device.

In some aspects, the techniques described herein relate to a method, wherein generating the guidance image includes applying a transparency filter to the screenshot.

In some aspects, the techniques described herein relate to a method, further including recalling the guidance image subsequent to termination of display of the guidance image after a predetermined time interval.

In some aspects, the techniques described herein relate to a method, further including receiving a user request to recall the guidance image and displaying the guidance image responsive to the user request.

In some aspects, the techniques described herein relate to a method, further including detecting that a position of the one or more touchpoints have changed; and recalling the guidance image for display based on the detection that the one or more touchpoints have changed.

In some aspects, the techniques described herein relate to a method, wherein the guidance image includes the screenshot and one or more graphics to identify the one or more touchpoints of the application.

In some aspects, the techniques described herein relate to a system, including: one or more processors; and one or more computer-readable storage media storing instructions that are executable by the one or more processors to: capture a screenshot of digital content from a gaming application displayed by a remote display device as part of a content connectivity session between a mobile device and the remote display device: generate a guidance image based on the screenshot for display by the mobile device as part of the content connectivity session, the guidance image indicating one or more touchpoints of the gaming application; and display the guidance image in a user interface of the mobile device.

In some aspects, the techniques described herein relate to a system, wherein the guidance image is dismissed responsive to receipt of proximity-based input to the user interface of the mobile device.

In some aspects, the techniques described herein relate to a system, wherein the guidance image is recalled for display by the mobile device subsequent to dismissal based on user input to recall the guidance image, the recalled guidance image including an updated screenshot of the digital content displayed by the remote display device.

In some aspects, the techniques described herein relate to a system, wherein the guidance image is recalled for display by the mobile device subsequent to dismissal based on a detection of one or more off-target instances of proximity-based input as part of a user interaction with the gaming application, the recalled guidance image including an updated screenshot of the digital content displayed by the remote display device.

The invention claimed is:

1. A computing device, comprising:
   a content control module implemented at least partially in hardware and configured to:
   capture, by the computing device, a screenshot of digital content from a gaming application displayed by a remote display device as part of a content connectivity session between the computing device and the remote display device;
   generate a guidance image based on the screenshot, the guidance image indicating one or more touchpoints of the gaming application;
   display the guidance image in a user interface of the computing device as part of the content connectivity session;
   terminate display of the guidance image responsive to receipt of proximity-based input to the computing device; and
   configure the computing device with a recall rate that controls a frequency to recall the guidance image for display during the content connectivity session, the recall rate based in part on an on-target ratio calculated as a ratio of on-target instances of proximity-based input to off-target instances of proximity based input.

2. The computing device as described in claim 1, wherein the computing device displays a blank screen configured to control functionality of the gaming application via the one or more touchpoints subsequent to termination of display of the guidance image.

3. The computing device as described in claim 1, wherein to generate the guidance image includes adjusting an aspect ratio of the screenshot to configure the guidance image for display by the computing device.

4. The computing device as described in claim 1, wherein to generate the guidance image includes applying a transparency filter to the screenshot.

5. The computing device as described in claim 1, wherein the content control module is further configured to recall the guidance image subsequent to termination of display of the guidance image in accordance with the recall rate.

6. The computing device as described in claim 1, wherein the content control module is further configured to receive a user input to recall the guidance image subsequent to termination of display of the guidance image; and recall the guidance image for display responsive to the user input to recall the guidance image.

7. The computing device as described in claim 1, wherein the content control module is further configured to detect one or more off-target instances of proximity-based input as part of a user interaction with the gaming application subsequent to termination of display of the guidance image; and recall the guidance image for display based on detection of the one or more off-target instances of proximity-based input.

8. The computing device as described in claim 1, wherein the guidance image includes the screenshot and additional content to identify the one or more touchpoints of the gaming application.

9. A method, comprising:
   capturing, by a mobile device, a screenshot of digital content from an application displayed by a remote display device as part of a content connectivity session between the mobile device and the remote display device;
   generating a guidance image based on the screenshot, the guidance image indicating one or more touchpoints of the application;
   displaying the guidance image in a user interface of the mobile device as part of the content connectivity session;
   receiving proximity-based input to the user interface of the mobile device;
   terminating display of the guidance image responsive to receipt of the proximity-based input; and
   configuring the mobile device with a recall rate to control a frequency to recall the guidance image for display during the content connectivity session, the recall rate based in part on an on-target ratio calculated as a ratio of on-target instances of proximity-based input to off-target instances of proximity based input.

10. The method as described in claim 9, wherein the mobile device displays a blank screen configured to control functionality of the application via the one or more touchpoints subsequent to termination of display of the guidance image.

11. The method as described in claim 9, wherein generating the guidance image includes adjusting an aspect ratio of the screenshot to configure the guidance image for display by the mobile device.

12. The method as described in claim 9, wherein generating the guidance image includes applying a transparency filter to the screenshot.

13. The method as described in claim 9, further comprising recalling the guidance image subsequent to termination of display of the guidance image in accordance with the recall rate.

14. The method as described in claim 9, further comprising receiving a user request to recall the guidance image and displaying the guidance image responsive to the user request.

15. The method as described in claim 9, further comprising detecting that a position of the one or more touchpoints have changed; and recalling the guidance image for display based on the detection that the one or more touchpoints have changed.

16. The method as described in claim 9, wherein the guidance image includes the screenshot and one or more graphics to identify the one or more touchpoints of the application.

17. A system, comprising:
one or more processors; and
one or more computer-readable storage media storing instructions that are executable by the one or more processors to:
capture a screenshot of digital content from a gaming application displayed by a remote display device as part of a content connectivity session between a mobile device and the remote display device;
generate a guidance image based on the screenshot for display by the mobile device as part of the content connectivity session, the guidance image indicating one or more touchpoints of the gaming application;
calculate a recall rate to control a frequency of display of the guidance image during the content connectivity session, the recall rate based in part on an on-target ratio of proximity based input calculated as a ratio of on-target instances of proximity-based input to off-target instances of proximity based input; and
display the guidance image in a user interface of the mobile device in accordance with the recall rate.

18. The system as described in claim 17, wherein the guidance image is dismissed responsive to receipt of proximity-based input to the user interface of the mobile device.

19. The system as described in claim 18, wherein the guidance image is recalled for display by the mobile device subsequent to dismissal in accordance with the recall rate, the recalled guidance image including an updated screenshot of the digital content displayed by the remote display device.

20. The system as described in claim 17, wherein the recall rate decreases as the content connectivity session continues.

\* \* \* \* \*